United States Patent
Krappen

(10) Patent No.: US 12,232,510 B2
(45) Date of Patent: Feb. 25, 2025

(54) METHODS OF MAKING FROZEN CONFECTIONARY PRODUCTS AND RE-USING COMPONENTS UTILIZED THEREIN

(71) Applicant: SOCIETE DES PRODUITS NESTLE S.A., Vevey (CH)

(72) Inventor: Edgar Heinrich Krappen, Tafers (CH)

(73) Assignee: SOCIETE DES PRODUITS NESTLE S.A., Vevey (CH)

( * ) Notice: Subject to any disclaimer, the term of this patent is extended or adjusted under 35 U.S.C. 154(b) by 266 days.

(21) Appl. No.: 17/756,773

(22) PCT Filed: Dec. 3, 2020

(86) PCT No.: PCT/EP2020/084355
§ 371 (c)(1),
(2) Date: Jun. 2, 2022

(87) PCT Pub. No.: WO2021/110787
PCT Pub. Date: Jun. 10, 2021

(65) Prior Publication Data
US 2023/0011850 A1    Jan. 12, 2023

(30) Foreign Application Priority Data
Dec. 6, 2019   (EP) ...................................... 19214251

(51) Int. Cl.
A23G 9/28       (2006.01)
G07F 11/04      (2006.01)

(52) U.S. Cl.
CPC ............. *A23G 9/283* (2013.01); *A23G 9/288* (2013.01); *G07F 11/04* (2013.01)

(58) Field of Classification Search
CPC .......................... G07F 17/0071; A23G 9/288
See application file for complete search history.

(56) References Cited

U.S. PATENT DOCUMENTS

| | | | |
|---|---|---|---|
| 1,642,200 A | 9/1927 | Hall | |
| 2,148,451 A | 2/1939 | Elliott, Sr. | |

(Continued)

FOREIGN PATENT DOCUMENTS

| | | | |
|---|---|---|---|
| CN | 1968738 A | 5/2007 | |
| CN | 101044063 A | 9/2007 | |

(Continued)

OTHER PUBLICATIONS

European Office Action for Appl No. 20 815 860.0-1105 dated Jun. 19, 2023.

(Continued)

*Primary Examiner* — Jason K Niesz
(74) *Attorney, Agent, or Firm* — K&L Gates LLP

(57) ABSTRACT

A method of dispensing a frozen confectionary product from a dispensing machine. The method can include loading one or more tubes comprising a frozen confectionary or a component of a frozen confectionary from a storage tray onto a serving station located in the dispensing machine; positioning the container in the serving station under the one or more tubes; dispensing the frozen confectionary or component of the frozen confectionary into the container; optionally placing a spoon into the container; and conveying the frozen confectionary product to an outlet located on the dispensing machine. A method of supplying a dispensing machine with frozen confectionaries and/or components of frozen confectionaries is also provided.

14 Claims, 15 Drawing Sheets

(56) References Cited

U.S. PATENT DOCUMENTS

| | | | |
|---|---|---|---|
| 2,495,077 A | | 1/1950 | Protzeller |
| 2,555,984 A | | 6/1951 | Mercier et al. |
| 3,876,110 A | | 4/1975 | Logie |
| 4,420,948 A | | 12/1983 | Savage |
| 5,027,698 A | * | 7/1991 | Chirnomas ............. G07F 13/10 221/150 HC |
| 5,048,724 A | * | 9/1991 | Thomas ................. A23G 9/285 222/105 |
| 5,405,054 A | | 4/1995 | Thomas |
| 5,700,494 A | * | 12/1997 | Masse ................... A23G 9/283 426/516 |
| 7,621,669 B1 | | 11/2009 | Gerber |
| 2007/0267087 A1 | * | 11/2007 | Jones .................... A23G 9/228 141/18 |
| 2009/0224419 A1 | | 9/2009 | Anderson |
| 2015/0216201 A1 | | 8/2015 | Bruckner et al. |

FOREIGN PATENT DOCUMENTS

| | | |
|---|---|---|
| CN | 104782875 A | 7/2015 |
| CN | 107533779 A | 1/2018 |
| EP | 0995685 | 4/2000 |
| GB | 502552 | 3/1939 |
| GB | 2230057 | 10/1990 |
| WO | 2004103831 | 12/2004 |
| WO | 2004107873 | 12/2004 |
| WO | 2012007770 | 1/2012 |
| WO | 2014184579 | 11/2014 |

OTHER PUBLICATIONS

Chinese Office Action for Appl No. 202080084084.5 dated Jul. 29, 2023.

* cited by examiner

METHODS OF MAKING FROZEN CONFECTIONARY PRODUCTS AND RE-USING COMPONENTS UTILIZED THEREIN

CROSS REFERENCE TO RELATED APPLICATIONS

The present application is a National Stage of International Application No. PCT/EP2020/084355, filed on Dec. 3, 2020, which claims priority to European Patent Application No. 19214251.1, filed on Dec. 6, 2019, the entire contents of which are being incorporated herein by reference.

TECHNICAL FIELD

The present disclosure generally relates to frozen food compositions such as frozen confectionary products. More specifically, the present disclosure relates to methods of making frozen confectionary products.

BACKGROUND

Dispensing of frozen confectionary products is typically done by an operator working at a counter, truck, or kiosk. However, the speed at which a consumer is able to receive a frozen confectionary product is greatly limited by the speed at which the operator is able to prepare the frozen confectionary product. Moreover, when the frozen confectionary product comprises multiple flavors, sauces, and/or toppings, the time to dispense the frozen confectionary product increases.

Additionally, dispensing of frozen confectionary products generates a great deal of waste. For example, each frozen confectionary flavor, sauce and/or topping is stored in a separate container prior to being dispensed to a consumer. Moreover, the containers holding the frozen confectionary product dispensed to the consumers and the spoons used in frozen confectionary products can all generate waste.

SUMMARY

Embodiments provided by the present disclosure can allow a consumer to receive a customizable frozen confectionary product from an automated dispensing machine. In a general embodiment, a method of dispensing a frozen confectionary product is disclosed in which one or more tubes containing a frozen confectionary, or a component of a frozen confectionary, can be placed on a storage tray and transferred from a production facility to a dispensing machine. The tubes can be placed directly in the dispensing machine without the need to transfer the tubes off the storage tray or the contents of the tubes (i.e., the frozen confectionary or a component of a frozen confectionary) out of the tubes. The frozen confectionary and/or component thereof can then be used to provide a consumer with a customizable frozen confectionary product. The dispensing machine can also identify when a tube is below a pre-determined threshold and then send the tube to a second location (i.e., the production facility or an intermediate location) to be subsequently cleaned and reused.

For example, a tube can be filled with a frozen confectionary at a production facility and placed on a tray. The tray can be shipped to a dispensing machine and placed in the dispensing machine to provide a consumer with a customizable frozen confectionary product. After the tube is used, the tube can be collected, washed and reused (e.g., re-filled with another frozen confectionary product). Preferably the tubes can be washed at a production facility and then delivered to a production line located in the facility to be re-filled. Preferably the refilled frozen confectionary tubes can be placed on a tray to be shipped back to the dispensing machine in, for example, a refrigerated shipping box.

In an embodiment, the present disclosure provides a method of dispensing one or more frozen confectionary products directly to a consumer. The method comprises: loading one or more first tubes comprising a composition that is a frozen confectionary or a component of a frozen confectionary from a first storage tray located in a first storage area to a serving station; dispensing at least a portion of the composition that is a frozen confectionary or a component of a frozen confectionary from at least one of the one or more first tubes into a container; optionally placing a spoon into the container; and conveying the frozen confectionary product to an outlet. Preferably the first storage area, the serving station, and the outlet are located at the same venue.

In an embodiment, the method further comprises loading one or more second tubes from a second storage tray located in a second storage area to the serving station and dispensing at least a portion of an additional frozen confectionary or component of a frozen confectionary in the container. In an embodiment, multiple tubes comprising multiple frozen confectionaries and/or components of frozen confectionaries can be loaded onto the serving station and the contents dispensed into the container.

In an embodiment, the additional confectionary component may comprise a frozen confectionary sauce, for example, a syrup or a hot fudge. In an embodiment, the additional confectionary component may comprise a frozen confectionary topping, for example, nuts, candies, fruit or sprinkles.

In an embodiment, the method further comprises receiving an input from a consumer of a selected frozen confectionary product and storing the selected frozen confectionary product in a buffer unit located in the dispensing machine prior to conveying the frozen confectionary product to the consumer. In an embodiment, the buffer unit may remove frozen confectionary products that have not been picked up by a consumer within a pre-determined time threshold from the outlet. The frozen confectionary products may then be stored in the buffer unit and conveyed to a consumer at a later time or disposed of.

In an embodiment, the method further comprises detecting that the contents of a tube are below a pre-determined threshold; transferring the substantially emptied tube to an empty tube position located in the dispensing machine; shipping the emptied tube to a location different from the dispensing machine (e.g., the production facility or an intermediate location); cleaning the emptied tube at the location different from the dispensing machine; transferring the cleaned tube to a production line (e.g., the production facility); and filling the cleaned tube with a frozen confectionary or a component of a frozen confectionary.

In an embodiment, a method for supplying a dispensing machine with a frozen confectionary or a component of a frozen confectionary is provided. The method comprises: providing a tube, the tube comprising a first flap, a second locking flap, and a sealing cap; filling the tube with at least one of a frozen confectionary, a sauce, or a topping; placing the tube onto a storage tray; transporting the storage tray to a dispensing machine; and placing the storage tray directly into the dispensing machine without transferring the tubes off the storage tray or the contents of the tube out of the tube.

Preferably if the tube contains a frozen confectionary, the storage tray is transported in a refrigerated box. If the tube contains a sauce or topping, the storage tray may be transported at ambient temperature.

In an embodiment, the dispensing machine is a vending machine at which a plurality of tubes holding a plurality of frozen confectionaries or frozen confectionary components are received. Preferably the dispensing machine comprises service doors and sliding skids where the trays can be placed.

It is a further object of the present disclosure to provide a method for real-time ordering and inventory management of the dispensing machine. The method comprises detecting if one or more tubes are lower than a pre-determined threshold and automatically ordering replacement tubes from the production facility and/or automatically producing more confectionary product or components thereof.

For example, the dispensing machine can be in direct communication with a production facility (e.g., by a wireless communication network). When the contents of the tubes are at a lower than a pre-determined threshold, replacement tubes can be automatically shipped from the production facility to the dispensing machine. Preferably the replacement tubes are shipped automatically after receiving an indication from the dispensing machine with minimum or no user input.

An advantage of one or more embodiments provided by the present disclosure is to clean and reuse tubes comprising frozen confectionaries, toppings, and/or sauces.

Another advantage of one or more embodiments provided by the present disclosure is to reduce or eliminate waste when providing consumers with frozen confectionary products.

Another advantage of one or more embodiments provided by the present disclosure is to provide a dispensing machine that minimizes user input and/or operator involvement.

Still another advantage of one or more embodiments provided by the present disclosure is convenience for the consumer.

Still another advantage of the one or more embodiments provided by the present disclosure is improved inventory management of the dispensing machine.

Still another advantage of the one or more embodiments provided by the present disclosure is a compact design of the dispensing machine.

Additional features and advantages are described herein and will be apparent from the following Figures and Detailed Description.

DETAILED DESCRIPTION OF EXAMPLE EMBODIMENTS

Figure 1:
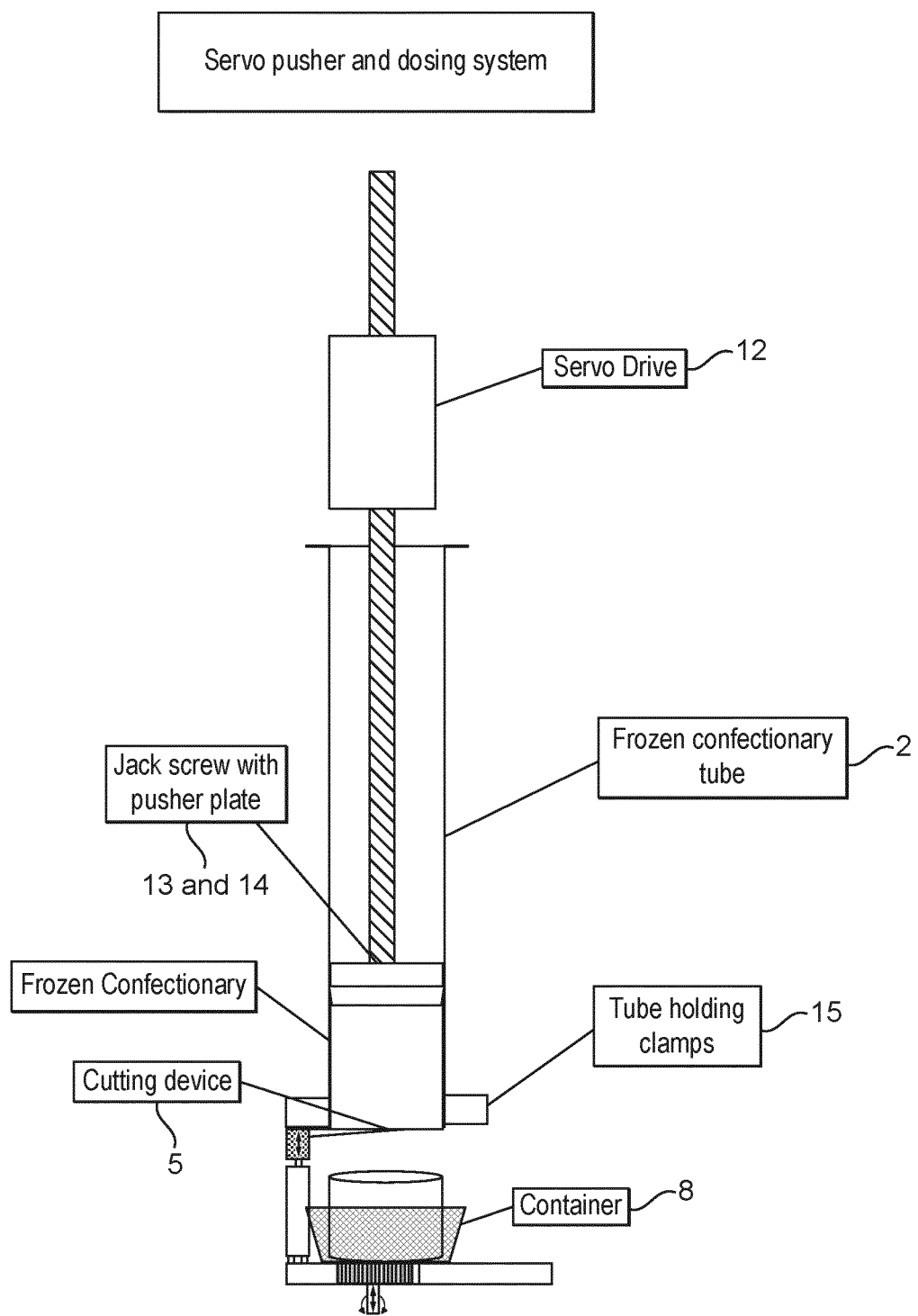
FIG. 1 is a view of a frozen confectionary tube that may be used to dispense the frozen confectionary product according to an embodiment of the methods disclosed herein.

Detailed embodiments of the methods are disclosed herein. However, it is to be understood that the disclosed embodiments are merely exemplary of the methods, which may be embodied in various forms. Therefore, specific functional details disclosed herein are not to be interpreted as limiting, but merely as a basis for the claims as a representative example for teaching one skilled in the art to variously employ the present disclosure.

It should be appreciated that various embodiments of the present disclosure can be combined with other embodiments of the disclosure and are merely illustrative of specific ways to make and use the disclosure and do not limit the scope of the disclosure when taken into consideration with the claims and the following detailed description.

As used in this disclosure and the appended claims, the singular forms "a," "an" and "the" include plural referents unless the context clearly dictates otherwise. Thus, for example, reference to "an ingredient" or "the ingredient" includes two or more ingredients.

The words "comprise," "comprises" and "comprising" are to be interpreted inclusively rather than exclusively. Likewise, the terms "include," "including" and "or" should all be construed to be inclusive, unless such a construction is clearly prohibited from the context. Nevertheless, the compositions disclosed herein may lack any element that is not specifically disclosed herein. Thus, a disclosure of an embodiment using the term "comprising" includes a disclosure of embodiments "consisting essentially of" and "consisting of" the components identified.

The term "and/or" used in the context of "X and/or Y" should be interpreted as "X," or "Y," or "X and Y." Similarly, "at least one of X or Y" means "X" or "Y," or "X and Y." Where used herein, the terms "example" and "such as," particularly when followed by a listing of terms, are merely exemplary and illustrative and should not be deemed to be exclusive or comprehensive.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number. All numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

The term "frozen confectionary" refers to any frozen or chilled confection. Non-limiting examples are ice cream, sorbet, sherbet, water ice, frozen yogurt, frozen dairy, soft ice, granitas, Mellorine, frozen custard, non-dairy frozen confection, milk ice, ice lolly, gelato or frozen jelly, or chilled desserts such as mousses, whipped yogurt, milk shakes or smoothie or coffee latté.

The term "topping" refers to any topping for a frozen or chilled confection. Non-limiting examples are nuts, sprinkles, fruit, or candies.

The term "sauce" refers to any sauce for a frozen or chilled confection. Non-limiting examples include chocolate syrup, caramel, hot fudge, strawberry sauce, or other syrups.

The term "frozen confectionary component" refers to a topping and/or a sauce for a frozen confectionary.

The term "frozen confectionary product" refers to a frozen confectionary and any sauce and/or topping.

An aspect of the present disclosure is methods of dispensing a frozen confectionary from a tube. FIG. 1 is a front view of a frozen confectionary tube 2 that may be used in the presently disclosed methods. The frozen confectionary tube 2 may have a circular cross-section, such as a circular opening of the tube and/or a circular bottom surface of the tube. However, the present disclosure is not limited to a specific shape of the tube and additional shapes such as a star, hexagon, square or polygon are contemplated. The frozen confectionary tube may be made of stainless steel, for example.

The frozen confectionary tube 2 may be held in a specific position and/or location by tube holding clamps 15. Preferably the tube holding clamps 15 are configured to prevent the frozen confectionary tube 2 from moving out of place when positioned in a dispensing machine 1 as described in greater detail hereafter.

In an embodiment, the frozen confectionary tube 2 may interact with a servo drive 12 which is preferably connected to a jack screw 13 and/or a pusher plate 14 to control the amount of the frozen confectionary dispensed from the frozen confectionary tube 2. For example, the servo drive 12 may drive the jack screw 13 and/or the pusher plate 14 to dispense a specified amount of frozen confectionary from the frozen confectionary tube 2. The servo drive 12 may be controlled by a controller 27. Preferably a cutting device 5 may be used to slice the frozen confectionary. For example, the cutting device 5 may comprise a slicer or a heated wire configured to cut the frozen confectionary. The frozen confectionary may be dispensed into a container 8.

Figure 2:
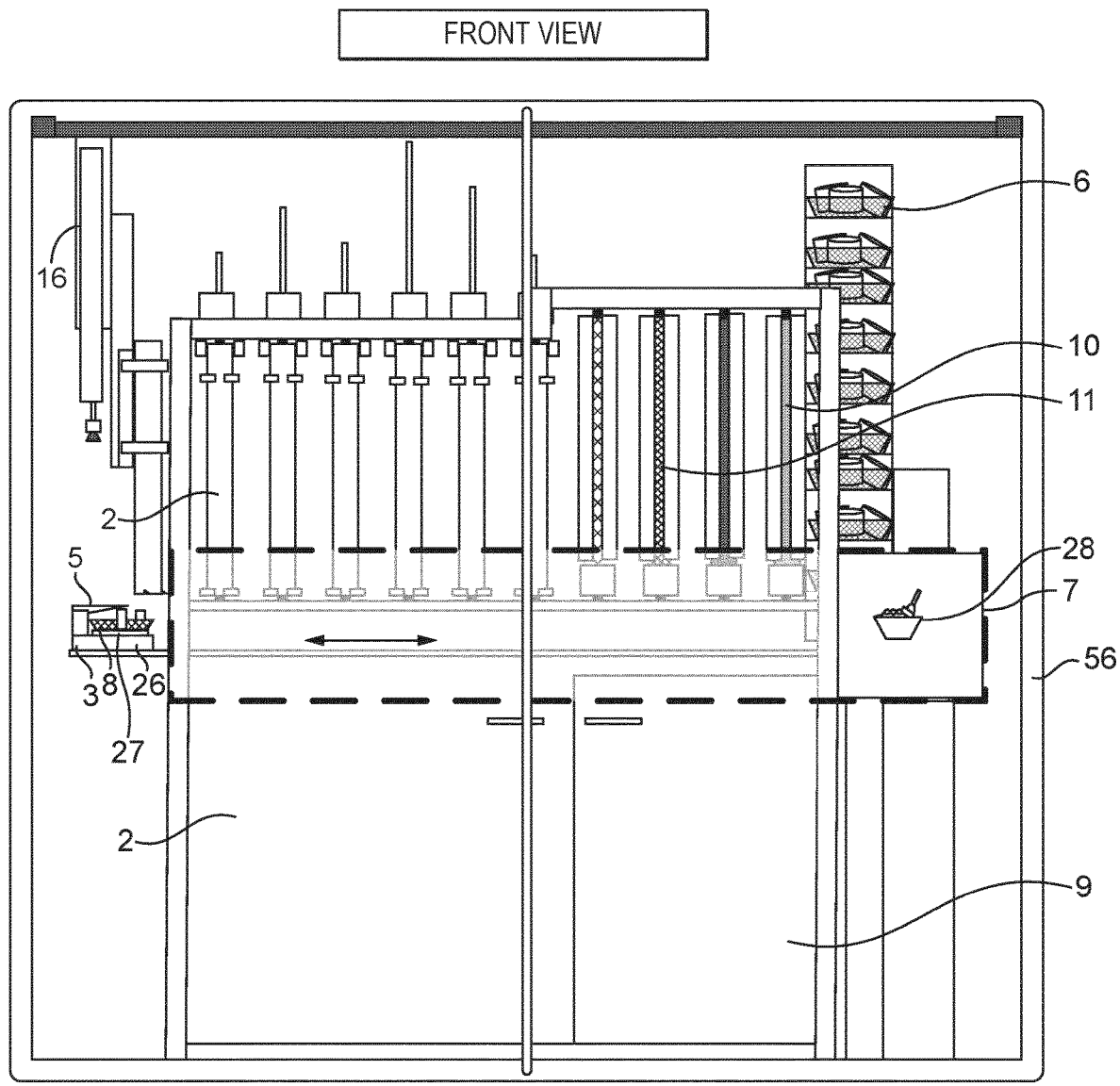
FIG. 2 is a front view of a dispensing machine that may be used to perform an embodiment of the methods disclosed herein.

In an embodiment, the dispensing machine 1 may comprise one or more frozen confectionary tubes 2. FIG. 2 is a front view of an embodiment of the dispensing machine 1 that may be used in the presently disclosed methods. The dispensing machine 1 may comprise one or more of the servo drive 12, the jack screw 13 or the pusher plate 14.

The dispensing machine 1 may be configured to automatically dispense a frozen confectionary product. For example, the dispensing machine 1 may comprise a rotating table 3 configured to hold and move the container 8 into a first position for receiving a first frozen confectionary from a first frozen confectionary tube 2. In an embodiment, after receiving a first frozen confectionary, the rotating table 3 may move the container 8 into a second position to receive a second frozen confectionary from a second frozen confectionary tube 2 and so forth. Preferably the rotating table 3 is configured to move sideways or front and back through the dispensing machine 1 to receive one or more frozen confectionaries and deliver a resultant frozen confectionary product 28 to an outlet 7 from which a consumer may remove the frozen confectionary product 28 from the dispensing machine 1 (i.e., the dispensing process).

Preferably the rotating table 3 moves through a visible area 26 that is visible to consumers outside the dispensing machine 1.

The dispensing machine 1 may comprise the outlet 7, which can convey the frozen confectionary product 28 to the consumer. The dispensing machine 1 may comprise a user interface 56. A consumer may enter information regarding a type and/or an amount of frozen confectionary into the user interface 56 (e.g., selected from options displayed by the user interface 56). The information may be conveyed to the controller 27 which can be at least partially located in the rotating table 3.

The dispensing machine 1 may comprise a buffer unit 6. The buffer unit 6 may receive the frozen confectionary product 28 from the rotating table 3. The buffer unit 6 may be used to store the frozen confectionary product 28 in the dispensing machine 1 after production from the corresponding frozen confectionary tube 2 and/or prior to conveying the frozen confectionary product 28 to the consumer. In an embodiment, the buffer unit 6 may remove a frozen confectionary product 28 from the outlet 7 that has not been picked up by a consumer within a pre-determined time.

Optionally the dispensing machine 1 may further comprise one or more topping tubes 10 and/or one or more sauce tubes 11. The rotating table 3 may be configured to move the container 8 into one or more further positions whereby the container 8 may receive toppings from the topping tubes 10 and/or sauces from the sauce tubes 11.

The dispensing machine 1 may further comprise service doors 9. The service doors 9 may be configured to open and receive the frozen confectionary tubes 1, the topping tubes 10, and/or the sauce tubes 11.

Figure 3:
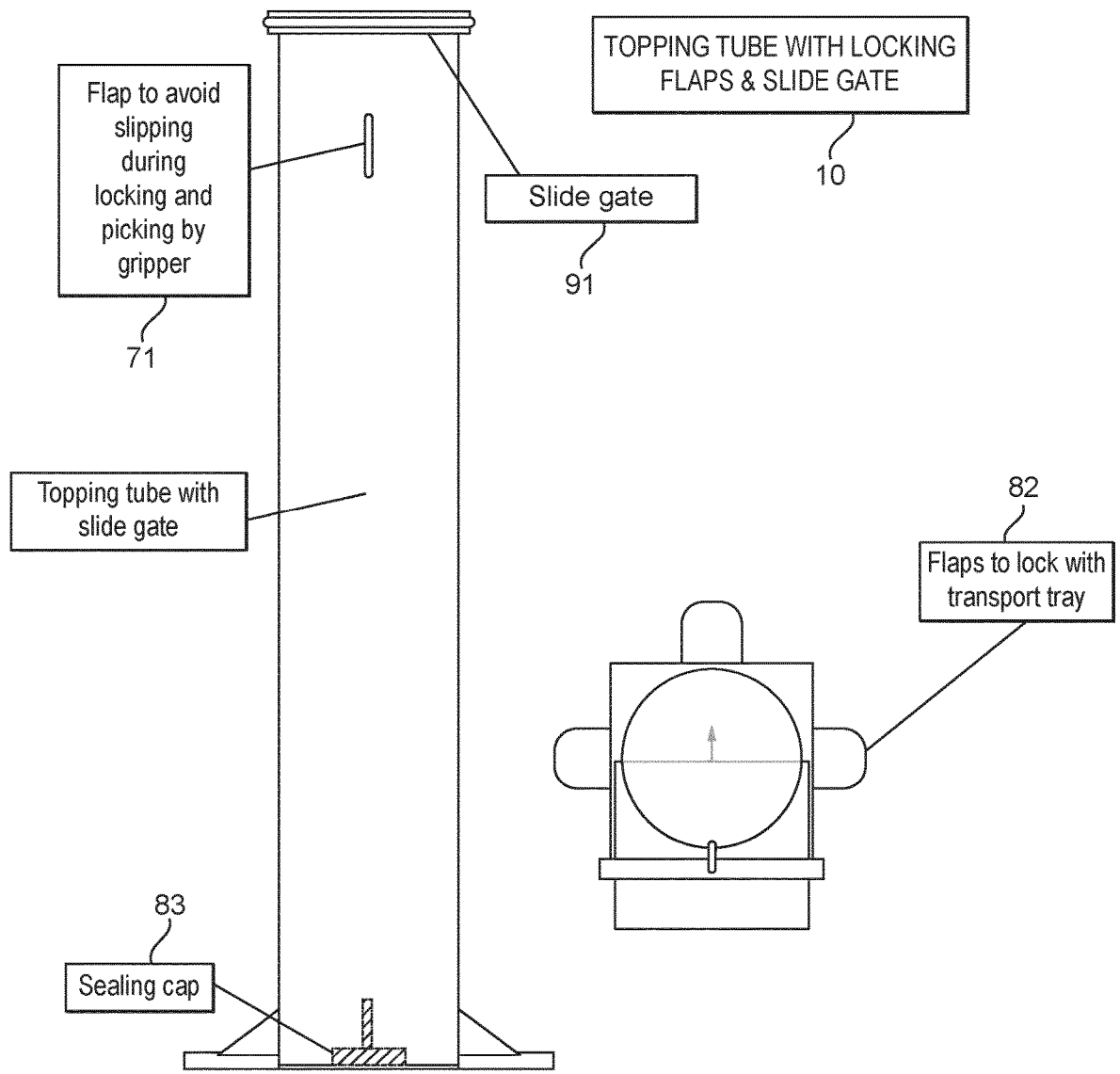
FIG. 3 is a view of a topping tube that may be used to dispense the frozen confectionary product according to an embodiment of the methods disclosed herein

FIG. 3 depicts an example of a topping tube 10 that may be used in an embodiment of the presently disclosed methods. The topping tube 10 may comprise a first flap 81 to prevent slipping when the topping tube 10 is moved as will be discussed later in greater detail. The topping tube 10 may further comprise a locking flap 82 to lock the topping tube into a storage tray 95 and/or the dispensing machine 1. The topping tube 10 may further comprise a slide gate 91 which may be removed to allow the topping tube 10 to be filled with toppings and/or to allow the topping tube 10 to dispense toppings into the container 8. The topping tube 10 may further comprise a sealing cap 83. The sealing cap 83 can keep the toppings in the topping tube 10.

Figure 4:
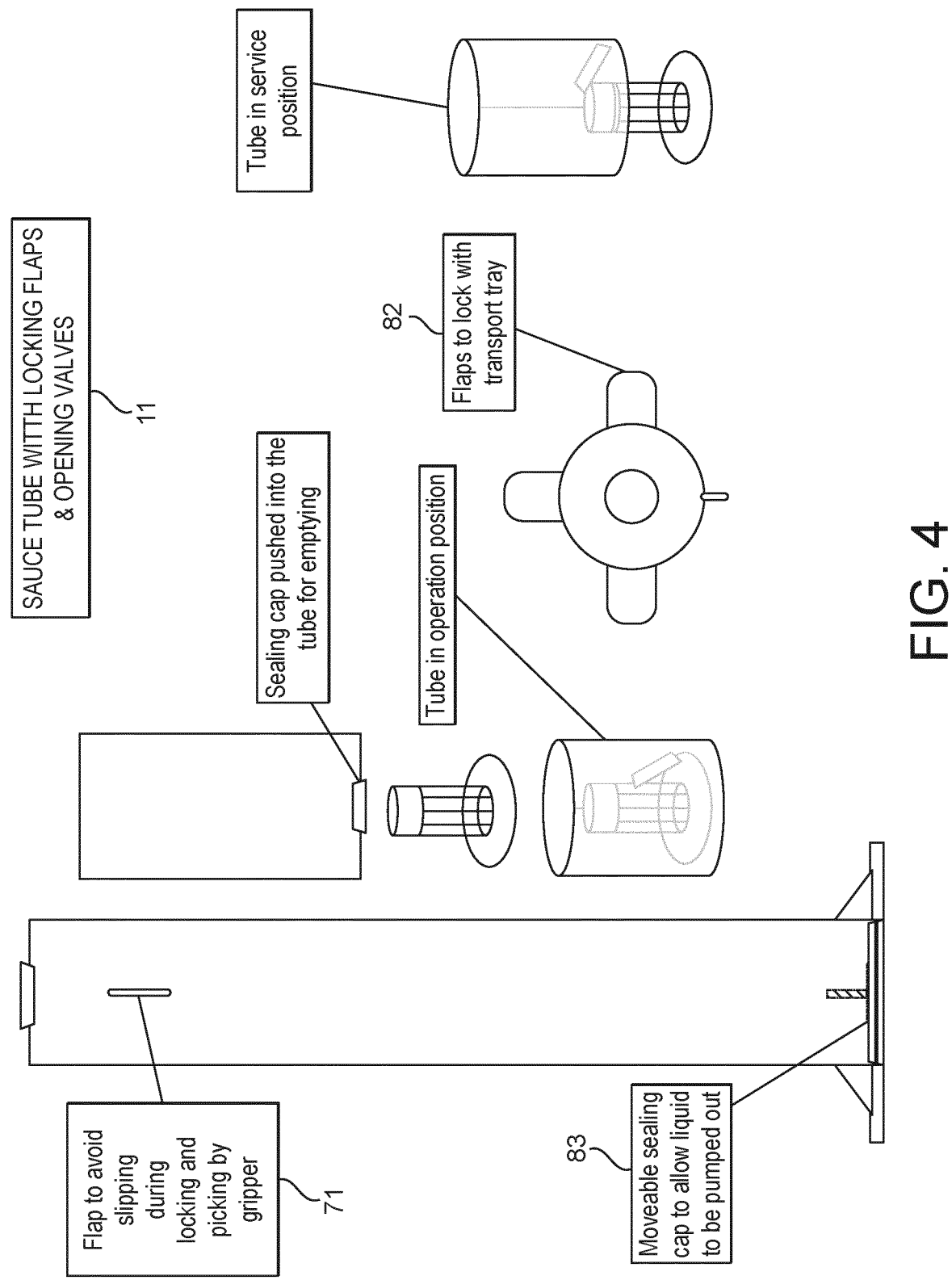
FIG. 4 is a view of a sauce tube that may be used to dispense the frozen confectionary product according to an embodiment of the methods disclosed herein.

FIG. 4 depicts an example of a sauce tube 11 for use in an embodiment of the presently disclosed methods. The sauce tube 11 may comprise a first flap 81 to prevent slipping when the sauce tube 11 is moved. The sauce tube 11 may further comprise a locking flap 82 to lock the sauce tube 11 into the storage tray 95 and/or the dispensing machine 1. The sauce tube 11 may further comprise a slide gate 91 which may be removed to allow the sauce tube 11 to be filled with sauce and/or to allow the sauce tube 11 to dispense sauce into the container 8. The sauce tube 11 may comprise a sealing cap 83. The sealing cap 83 may prevent the sauce from leaking out of the sauce tube 11.

Figure 5:
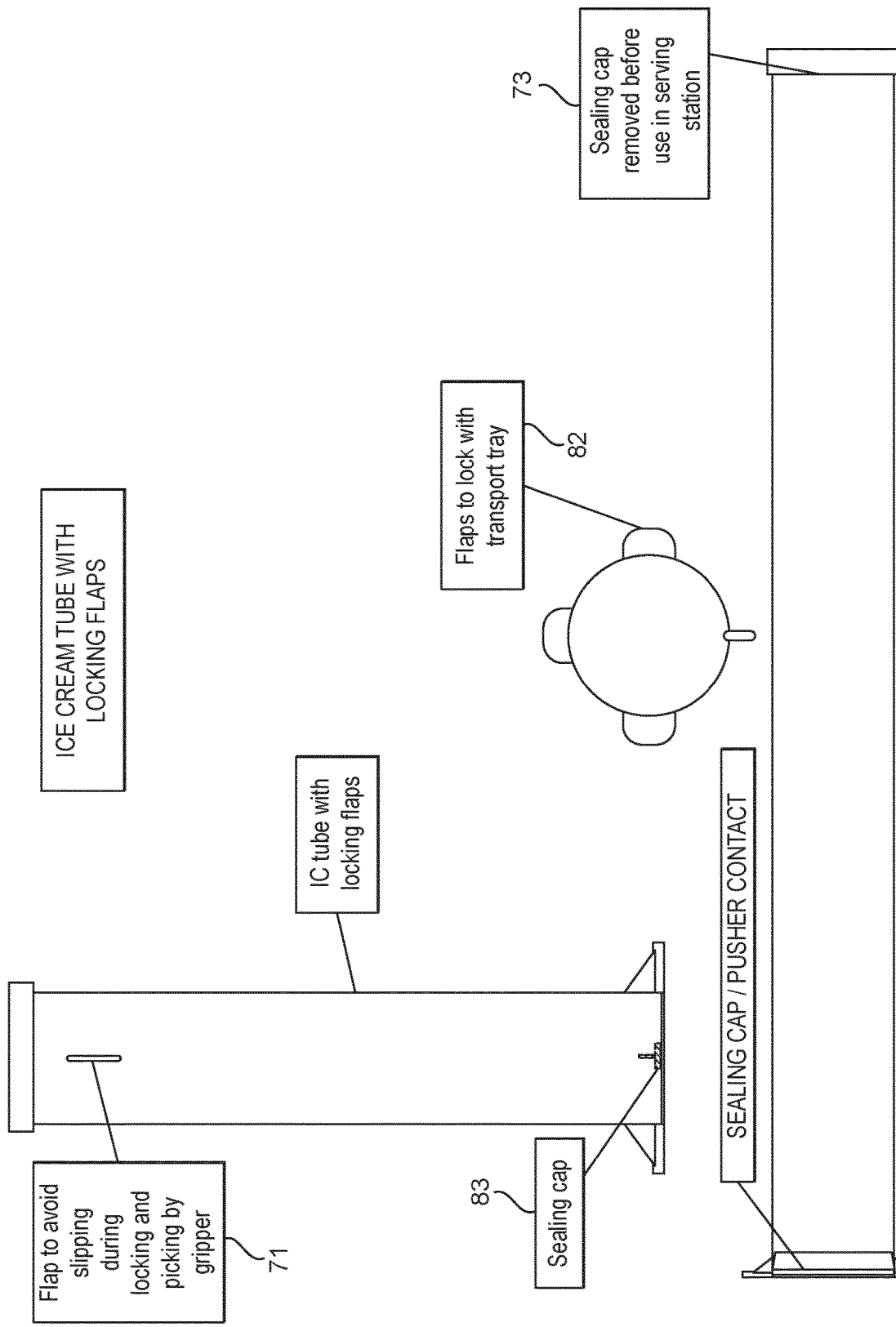
FIG. 5 is a view of a frozen confectionary tube that may be used to dispense the frozen confectionary product according to an embodiment of the methods disclosed herein.

FIG. 5 depicts an example of the frozen confectionary tube 2 for use in an embodiment of the presently disclosed methods. The frozen confectionary tube 2 may comprise a first flap 81 to prevent slipping when the frozen confectionary tube 2 is moved. The frozen confectionary tube 2 may further comprise a locking flap 82 to lock the frozen confectionary tube 2 into the storage tray 95 and/or the dispensing machine 1. The frozen confectionary tube 2 may further comprise a slide gate 91 which may be removed to allow the frozen confectionary tube 2 to be filled with frozen confectionary and/or to allow the frozen confectionary tube 2 to dispense frozen confectionary into the container 8. The frozen confectionary tube 2 may comprise a sealing cap 83. The sealing cap 83 may prevent the frozen confectionary from leaking out of the frozen confectionary tube 2. In an embodiment, the slide gate 91 and/or the sealing cap 83 may act as a contact point for the pusher plate 14.

Figure 6:
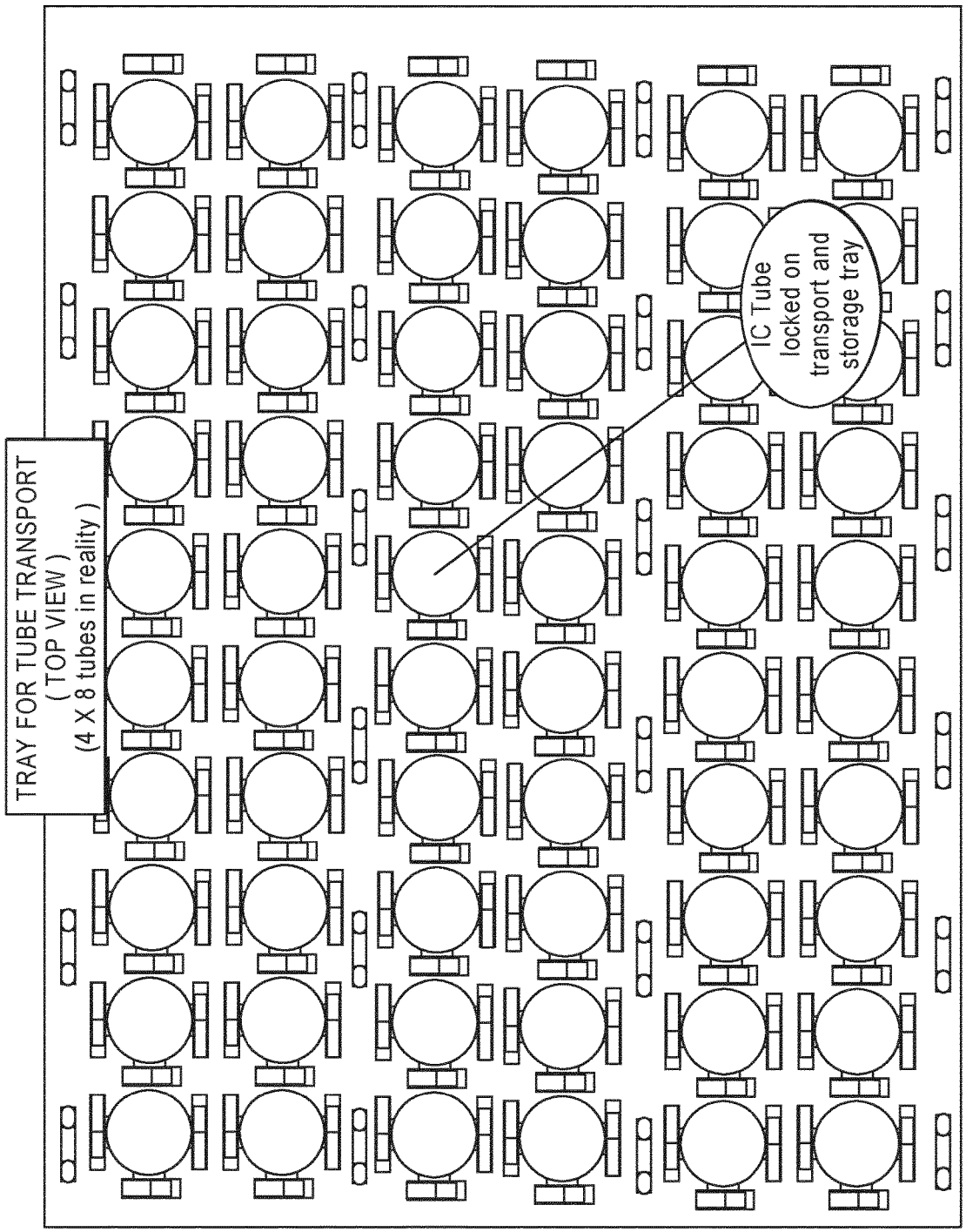
FIG. 6 is a top view of a storage tray that may be used to transport the tubes according to an embodiment of the methods disclosed herein
Figure 7:
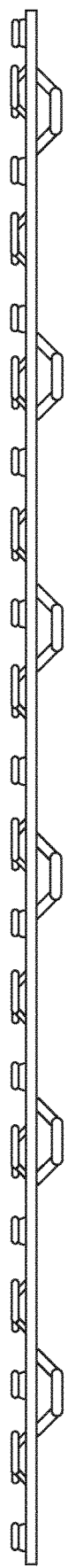
FIG. 7 is a side view of a storage tray that may be used to transport the tubes according to an embodiment of the methods disclosed herein

In an embodiment, the storage tray 95 is a stainless steel tray. FIG. 6 depicts a top view of an embodiment of the storage tray 95 which may be used to transport the tubes with the tube holding clamps 15. FIG. 7 depicts a side view of an embodiment of the storage tray 95 for transport. The storage tray 95 may be configured to allow the frozen confectionary tubes 2, the topping tubes 10, and/or the sauce tubes 11 to be locked and unlocked by an arm 16 located in the dispensing machine 1. The storage tray 95 is preferably configured to be stacked on top of a second storage tray 95 for ease in transport.

In an embodiment, the dispensing machine 1 may further comprise one or more arms 16 for moving the frozen confectionary tubes 2, the topping tubes 10, and/or the sauce tubes 11 from the storage tray 95 located in a storage area to a serving station as will be discussed in greater detail later.

Figure 8:
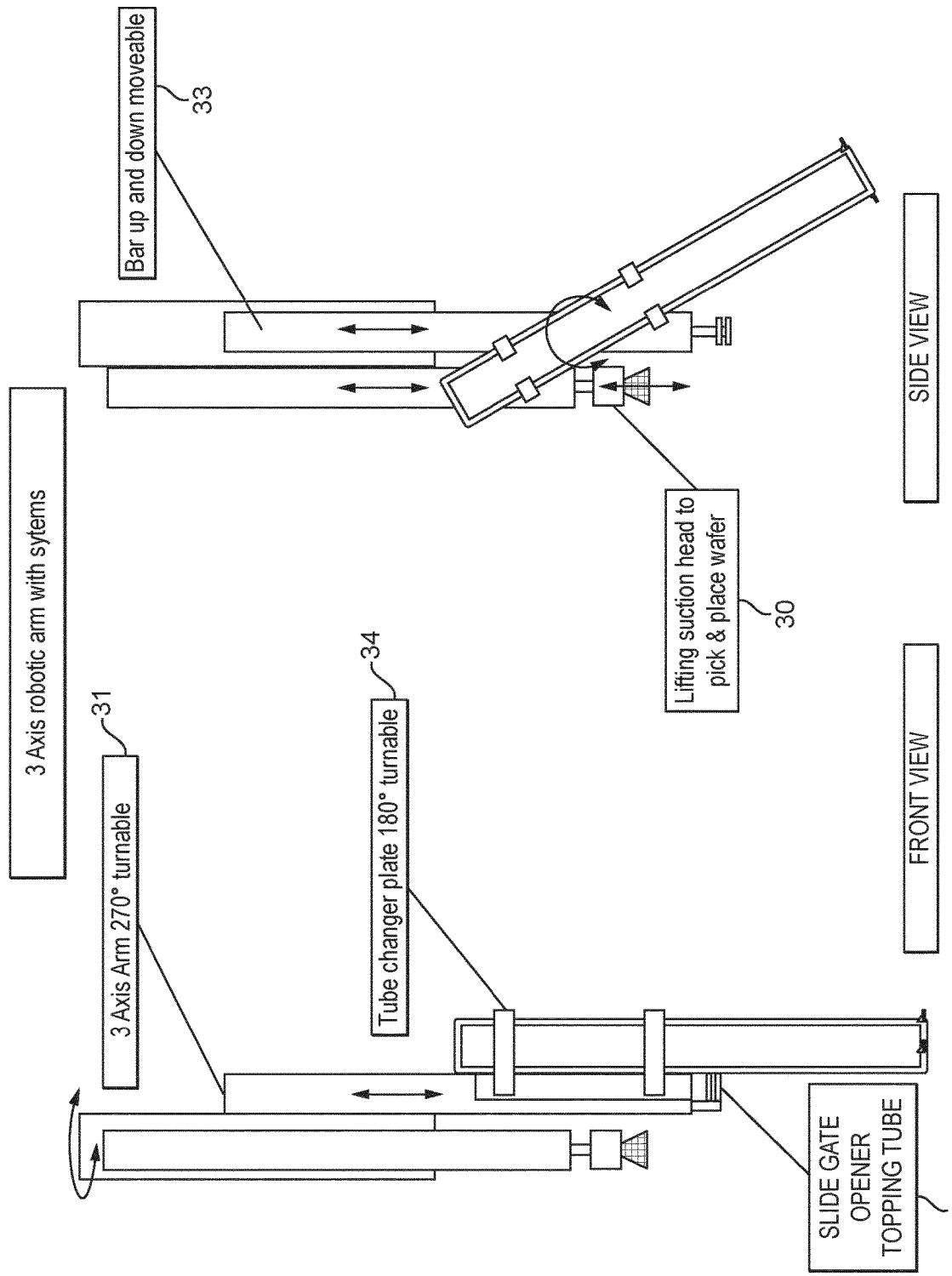
FIG. 8A is a front view of an arm that may be used to dispense the frozen confectionary product according to an embodiment of the methods disclosed herein.
FIG. 8B is a side view of an arm that may be used to dispense the frozen confectionary product according to an embodiment of the methods disclosed herein.

FIGS. 8A and 8B depict an example of the arm 16 that may be used in an embodiment of the present methods. The arm 16 may be a three-axis robotic arm. The use of a robotic arm may allow the dispensing machine to run without an operator. The arm 16 may comprise a lifting suction head 30 to attach to the container 8 and move the container 8 onto the rotating table 3. In an embodiment, the robotic arm 16 comprises a turntable 31 which can rotate 270°. In an embodiment, the arm 16 may further comprise a slide gate opener 32. The slide gate opener 32 may be configured to open the slide gate 91. In an embodiment, the arm 16 may also comprise a tube changer plate 34. In an embodiment, the arm 16 comprises a movable bar 33. The movable bar 33 may be configured to move up and down to transfer the frozen confectionary tubes 2, the topping tubes 10, and/or the sauce tubes 11 from the storage area to the serving station as will be described in greater detail later.

Figure 9:
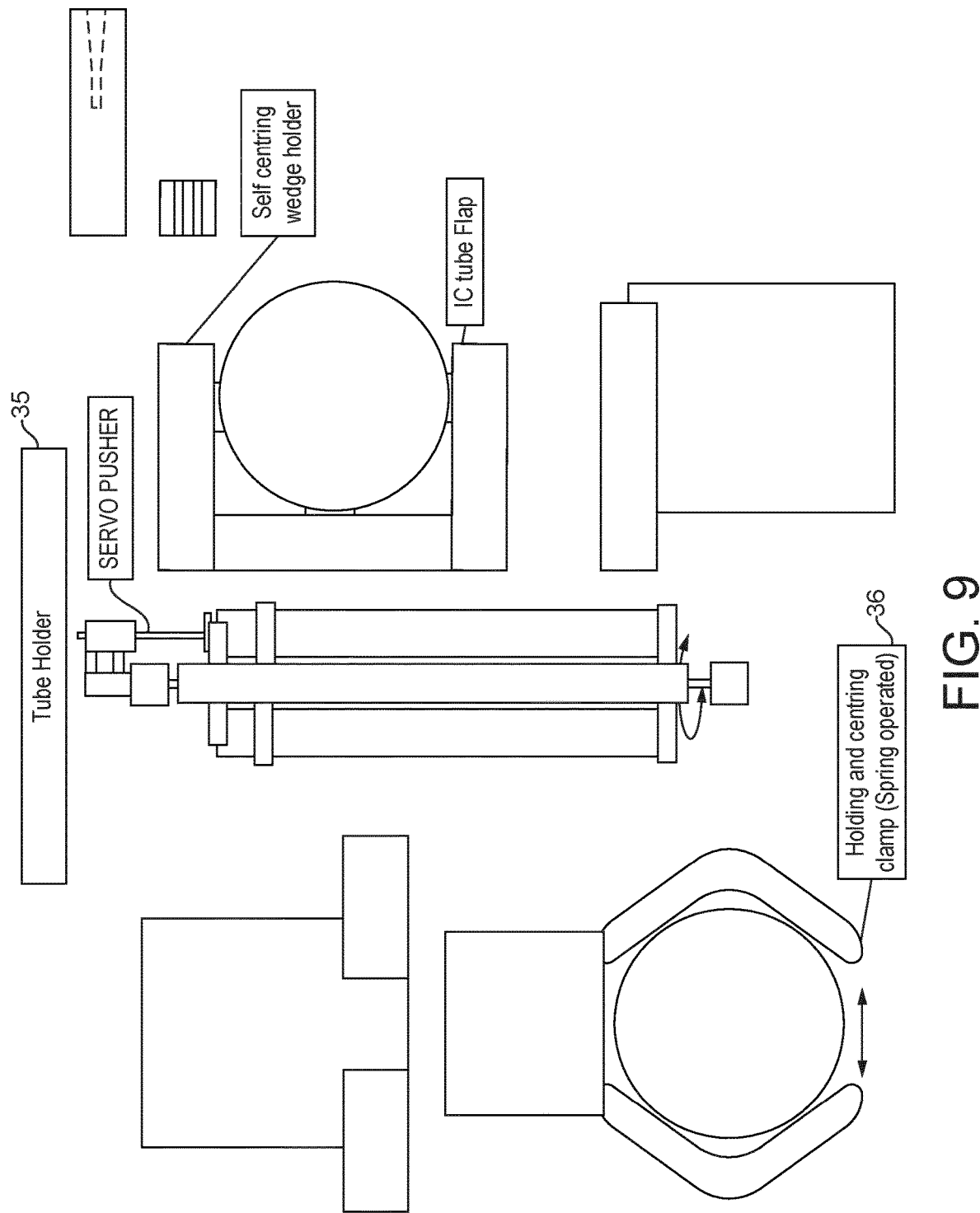
FIG. 9 is a view of a tube holder that may be used to dispense the frozen confectionary product according to an embodiment of the methods disclosed herein.

The dispensing machine 1 may further comprise a tube holder 35. FIG. 9 shows the tube holder 35 which may be configured to hold the frozen confectionary tubes 2, the sauce tubes 11, and/or the topping tubes 10. For example, a spring operated holding clamp 36 may be used to hold the frozen confectionary tubes 2, the sauce tubes 11, and/or the topping tubes 10 in place during transferring of the frozen confectionary tubes 2, the topping tubes 10, and/or the sauce tubes 11 from the storage tray and during dispensing of the frozen confectionary components from the frozen confectionary tubes 2, the topping tubes 10, and/or the sauce tubes 11.

Figure 10:
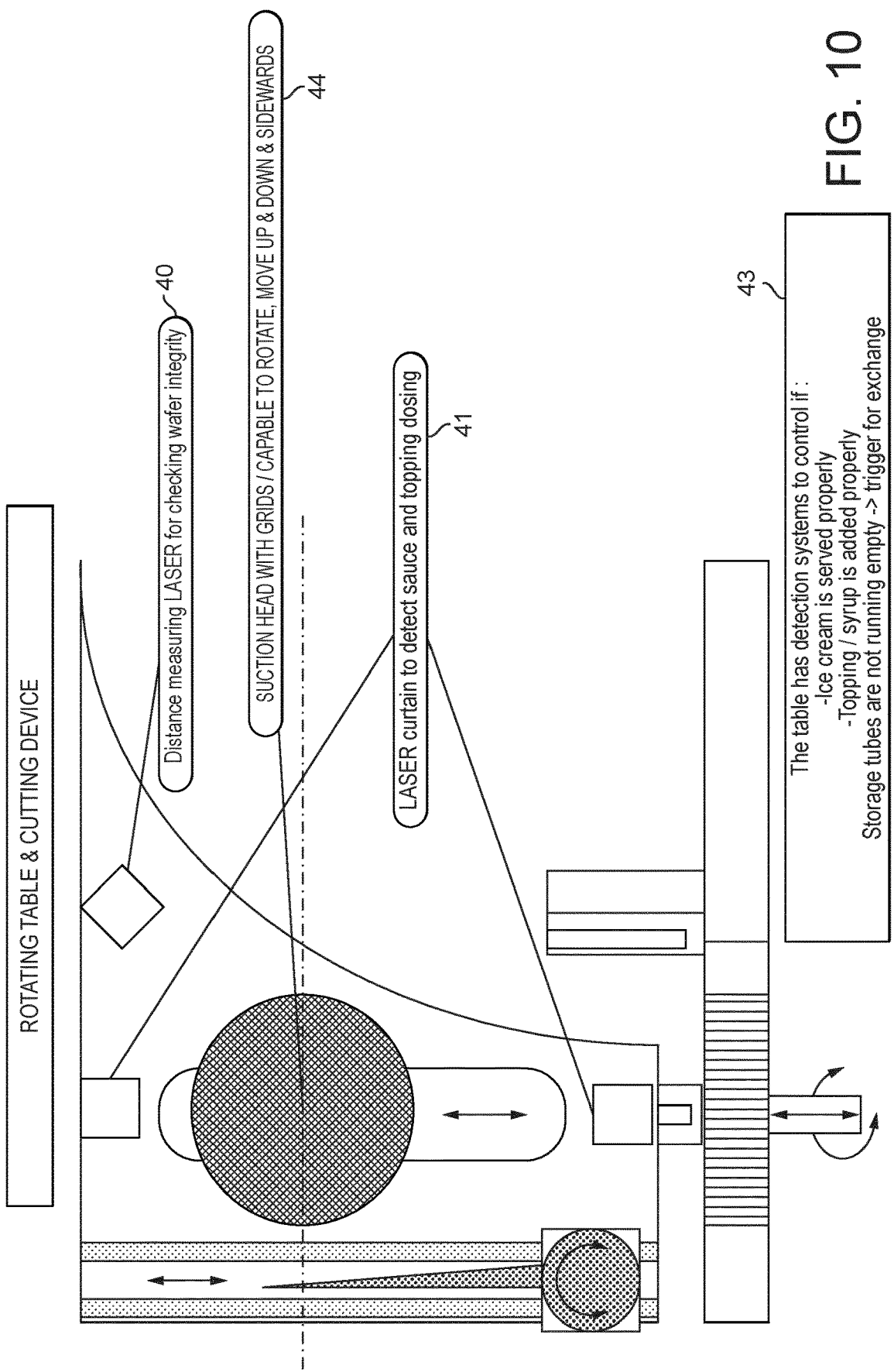
FIG. 10 is a view of a rotating table and cutting unit that may be used to dispense the frozen confectionary product according to an embodiment of the methods disclosed herein.
Figure 11:
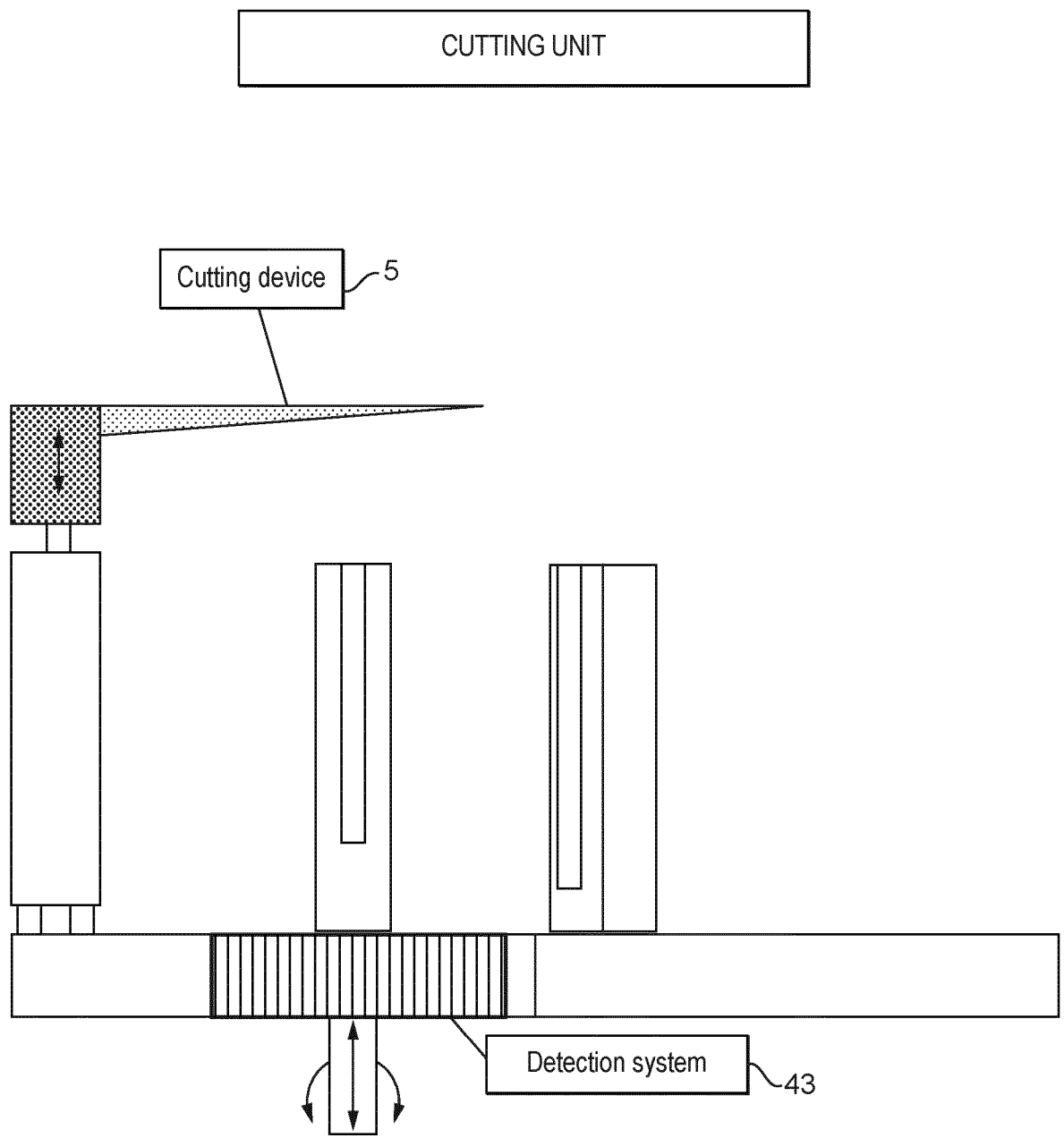
FIG. 11 is a view of a rotating table and cutting unit that may be used to dispense the frozen confectionary product according to an embodiment of the methods disclosed herein.

FIGS. 10 and 11 depict an embodiment of the rotating table 3 and the cutting device 5 that may be used in an embodiment of the presently disclosed methods. The rotating table 3 may comprise a suction head 44 that may comprise grids configured to rotate, move up and down, and/or move sideways. The rotating table 3 may further comprise a detection system 43 to control the dispensing of the frozen confectionary product 28. The detection system 43 may comprise a distance measuring laser 40 and/or a laser curtain 41 to detect the amount of sauce and/or toppings dispensed into the container 8.

The detection system 43 may further detect if the frozen confectionary tubes 2, the topping tubes 10, and/or the sauce tubes 11 are below a pre-determined threshold. For example, the detection system 43 may be configured to control the replacement of one or more of the frozen confectionary tubes 2, the topping tubes 10, and/or the sauce tubes 11 when the frozen confectionary tubes 2, the topping tubes 10, and/or the sauce tubes 11 reach a minimum pre-determined threshold of content as will be discussed in greater detail later.

Figure 12:
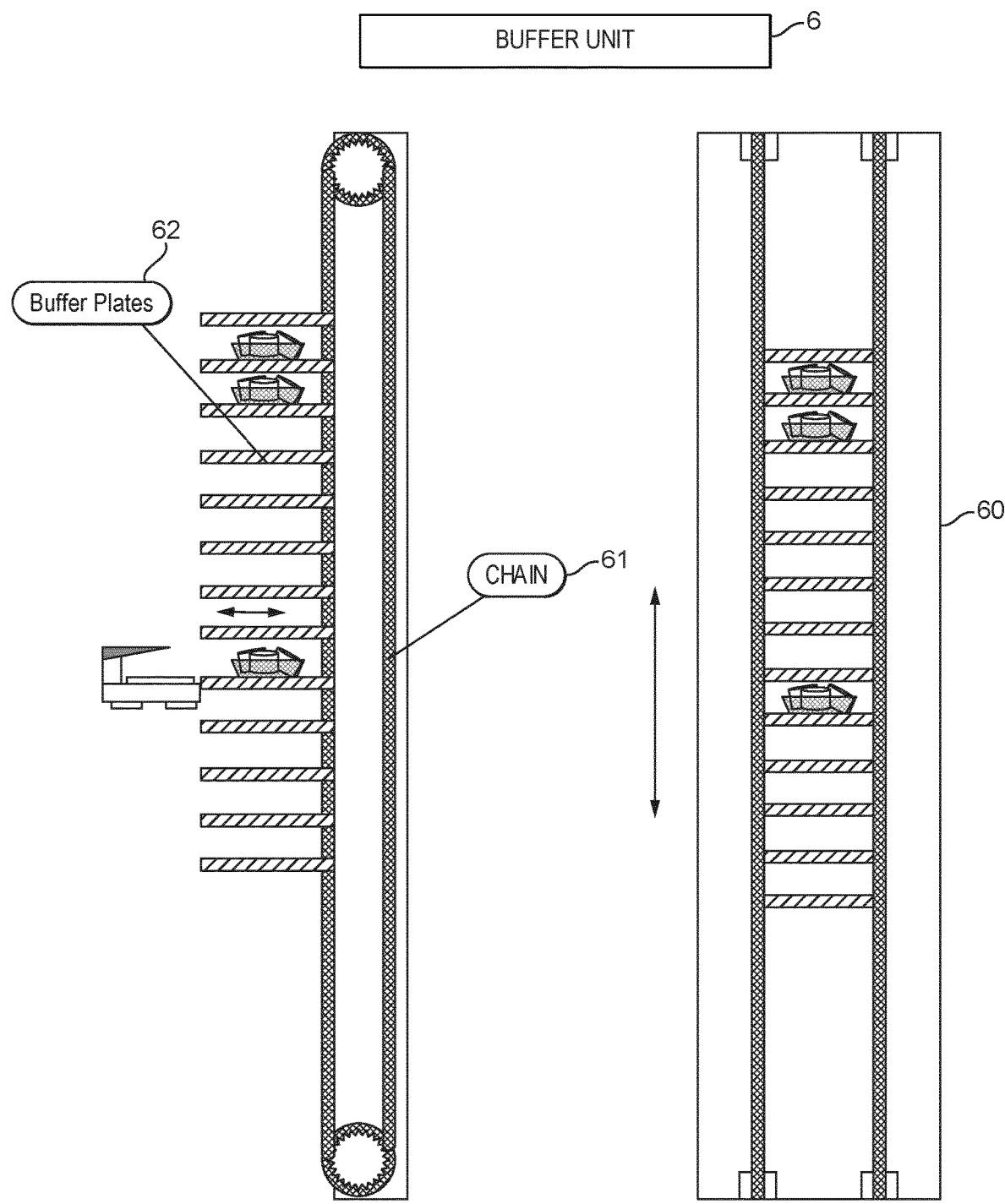
FIG. 12 is a view of a buffer unit that may be used to dispense the frozen confectionary product according to an embodiment of the methods disclosed herein.

FIG. 12 depicts an example of the buffer unit 6 that may be used in an embodiment of the presently disclosed method. Preferably the buffer unit 6 may be provided to store and serve the frozen confectionary products 28. The buffer unit 6 may further transfer frozen confectionary products 28 that were not removed by a consumer from the outlet 7 in a pre-determined amount of time. The buffer unit 6 may comprise a chain 61 and/or one or more buffer plates 62. The frozen confectionary product may be loaded onto the one or more buffer plates 62 and/or moved up and down by the chain 61.

Figure 13:
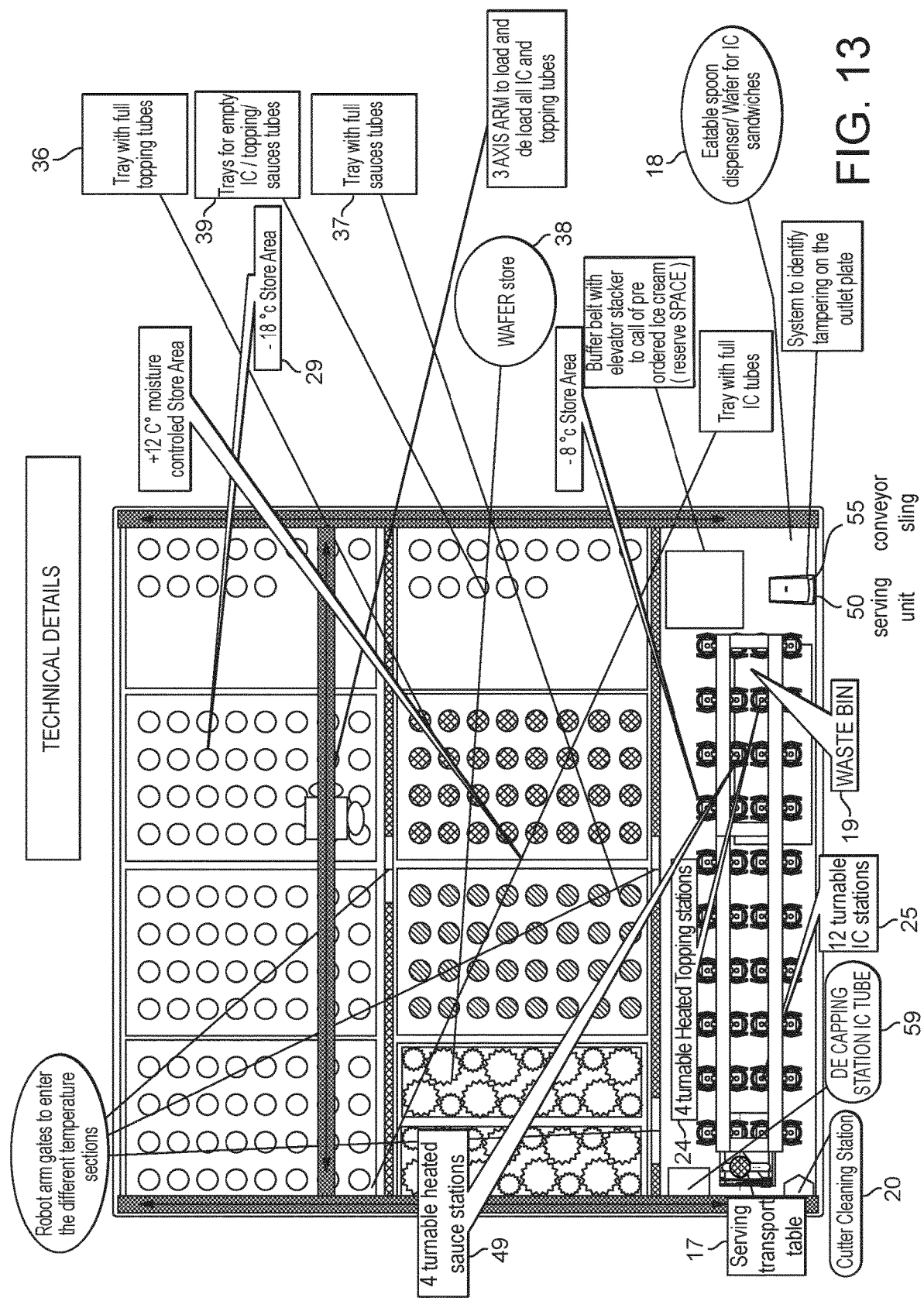
FIG. 13 is a schematic view of a dispensing machine that may be used to perform an embodiment of the methods disclosed herein.

FIG. 13 depicts an overview of the dispensing machine 1 that may be used in the presently disclosed embodiments. Preferably the dispensing machine 1 can comprise at least three different temperature zones. Preferably the first zone may be kept at a temperature lower than the second and third zones. Preferably the second zone may be kept at a temperature lower than the third zone. For example, the first zone may be kept at a temperature of approximately −12° C. or less. The second zone may be kept at a temperature of approximately −10° C.-0° C. The third zone may be kept at a temperature of approximately 6° C.-12° C. Preferably the zones are moisture controlled.

Preferably the frozen confectionary tubes 2 may be stored in a frozen confectionary storage area 29 located in the first zone. Preferably the sauce tubes 11 and/or topping tubes 10 may be stored respectively in a sauce storage area 37 and a topping storage area 36 located in the third zone. Preferably a serving station 17 may be located in the second zone.

The serving station 17 may comprise a sealing cap removal station 59 to remove the sealing caps 83 from the frozen confectionary tubes 2, the sauce tubes 11, and/or the topping tubes 10 to allow the contents of the frozen confectionary tubes 2, the topping tubes 10, and/or the sauce tubes 11 to be dispensed. The serving station 17 may further comprise a frozen confectionary turntable 25 which can dispense one or more frozen confectionaries from the frozen confectionary tubes 2. The serving station 17 may further comprise a topping turntable 24 which can dispense one or more toppings from topping tubes 10. The serving station 17 may further comprise a sauce turntable 49 to dispense one or more sauces from the sauce tubes 11. Preferably the topping turntable 24 and/or the sauce turntable 49 are heated. For example, the topping turntable 24 and/or the sauce turntable 49 may comprise heated jackets for heating the topping tubes 10 and/or the sauce tubes 11. In an embodiment, the topping turntable 24 and/or sauce turntable 49 may comprise a heating coil and/or a heated plate.

In an embodiment, the topping turntable 24 may comprise an outlet valve (e.g., a star valve) to dispense a topping serving from the topping tubes 10. In an embodiment, the sauce turntable may comprise peristaltic pumps to dispense a sauce serving from the sauce tubes 11. The peristaltic pumps may be heated.

The dispensing machine 1 may further comprise an empty tube position 39 for storing tubes that have lower than a pre-determined threshold amount of frozen confectionary and/or sauce and/or toppings. The arm 16 may move substantially emptied tubes to the emptied tube position 39.

The dispensing machine 1 may further comprise a spoon dispenser 18 configured to dispense spoons. For example, the spoons may be placed in the container 8 or dispensed directly to the outlet 7. The dispensing machine 1 may further comprise a waste bin 19 to collect any unused containers 8 (e.g., wafers) and/or spoons.

The dispensing machine may further comprise a conveyor sling 55 configured to move sideways to transfer the frozen confectionary product 28 from the serving unit 50 into the buffer unit 6 or from the buffer unit 6 into the serving unit 50.

In an embodiment, a cutter cleaning station 20 may be provided to clean the cutting device 5. For example, the cutting device 5 may be cleaned and sanitized by UV light.

Figure 14:
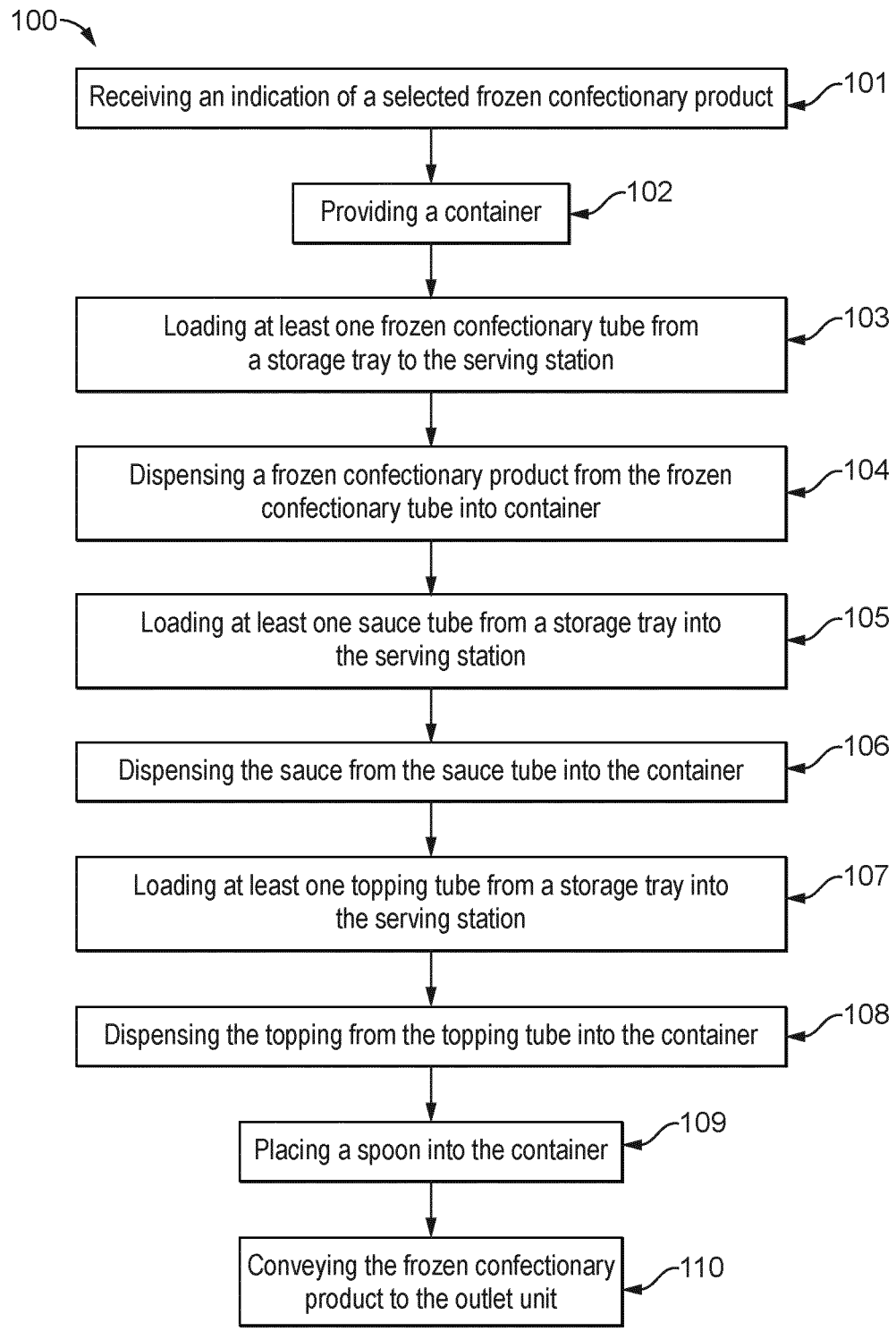
FIG. 14 is a flowchart showing a non-limiting example of a method according to the present disclosure.

An aspect of the present disclosure is a method 100 of dispensing a frozen confectionary product. A non-limiting example of the method 100 is generally illustrated in FIG. 14. Some embodiments of the method 100 can omit one or more of the steps depicted in FIG. 14, and some embodiments of the method 100 can include one or more additional steps. The depicted steps are preferably performed in the order in which they are illustrated (as shown by arrows), but some embodiments can perform the steps in a different order. Indeed, the present disclosure is not limited to the specific embodiment shown in FIG. 14.

The method 100 generally may comprise receiving an indication of a selected frozen confectionary product; providing a container; loading one or more first tubes comprising a composition that is a frozen confectionary or a component of a frozen confectionary from a first storage tray located in a first storage area to a serving station; dispensing at least a portion of the composition that is a frozen confectionary or a component of a frozen confectionary from at least one of the one or more first tubes into the container; optionally placing a spoon into the container; and conveying the frozen confectionary product to an outlet. A detailed explanation of the method 100 now follows.

The method 100 can comprise receiving an indication of a selected frozen confectionary product 28 (Step 101). For example, the indication may be received by the controller 27 which may be at least partially located in the rotating table 3. The indication may comprise an amount and a type of frozen confectionary, an amount and a type of sauce, and an amount and a type of topping to be included in the frozen confectionary product 28. The indication may be provided by the user input device 56. In an embodiment the indication may be provided automatically in response to a user input at a location remote from the dispensing machine 1 (e.g., from an application on a mobile phone).

In an embodiment, the method 100 can comprise providing the container 8 to hold the frozen confectionary product 28 (Step 102). Preferably the container 8 is made of edible materials. For example, the container 8 can be a wafer plate or a wafer cup. In an embodiment, providing the container 8 comprises the arm 16 picking up and placing the container 8 on the rotating table 3. For example, the arm 16 may pick up the container 8 from a container storage area 38 using the lifting suction head 30 and place the container 8 on the rotating table 3 to be filled with the frozen confectionary and, optionally, one or more toppings and/or sauces. The arm 16 may be configured to provide the container 8 automatically in response to a signal from the controller 27. In this manner, no user input is required to provide the container 8.

In an embodiment, providing the container 8 may comprise using the distance measuring laser 40 to check the integrity of the container 8. The distance measuring laser may be at least partially located on the rotating table 3. If the container 8 is cracked or broken, the arm 16 may automatically dispose of the container 8 in the waste bin 19 and select a new container 8. For example, the distance measuring laser 40 may send a signal to the controller 27 which can direct the arm 16, without user input, to dispose of the container 8 if the container 8 is broken or cracked.

The method 100 can comprise loading at least one frozen confectionary tube 2 from a storage tray 95 located in the frozen confectionary storage area 29 to the serving station 17 (Step 103). Preferably the arm 16 may be used to load the frozen confectionary tube 2 from the frozen confectionary storage tray 95 into the serving station 17 (shown in FIG. 15). For example, the arm 16 may be configured to rotate about 360° to remove the frozen confectionary tube 2 from the storage tray 95. The tube changer plate 33 preferably grips the frozen confectionary tube 2 and moves the frozen confectionary tube 2 to the serving station 17. The movable bar 33 of the arm 16 preferably moves up and down to rotate the frozen confectionary tube 2 into the proper position.

The method 100 can comprise dispensing a serving of the frozen confectionary into the container 8 (Step 104). In an embodiment, dispensing the serving of the frozen confectionary comprises positioning the container 8 under a first frozen confectionary tube 2 to receive a first frozen confectionary. Optionally the method 100 can comprise positioning the container 8 under a second frozen confectionary tube 2 to receive a second frozen confectionary additional or alternate to the first frozen confectionary. Optionally the method 100 can comprise positioning the container 8 under a third frozen confectionary tube 2 to receive a third frozen confectionary additional or alternate to the first frozen confectionary or the second frozen confectionary. It is contemplated any number of frozen confectionaries may be dispensed into the container 8. Preferably the frozen confectionary is disc shaped. However, additional shapes are contemplated such as a star, hexagon, square or polygon.

In a preferred embodiment, the arm 16 may be configured to load the frozen confectionary tubes 2 automatically without user input, most preferably by the controller 27 in direct response to the user input. For example, the controller 27 directs the arm 16 to load the frozen confectionary tubes 2 corresponding with the selected frozen confectionary product.

In an embodiment, dispensing the serving of the frozen confectionary comprises the servo drive 12 driving the jack screw 13 and/or the pusher plate 14 down a pre-determined distance dispense a serving of the frozen confectionary from the frozen confectionary tube 2. For example, a consumer may input a selected amount of a frozen confectionary into the user input device 56 and the controller 27 may be operable to control the servo drive 12, without user input, to dispense the selected amount of frozen confectionary from the frozen confectionary tube 2. In an embodiment, the cutting device 5 is used to cut the serving of frozen confectionary dispensed from the frozen confectionary tube 2. Preferably the controller 27 may be operable to control the cutting device 5 to cut the serving of frozen confectionary.

In an embodiment, after the frozen confectionary serving is dispensed from the frozen confectionary tube 2, the controller 27 may be operable to direct the arm 16 to return the frozen confectionary tube 2 containing any remaining frozen confectionary back to the frozen confectionary storage tray 95.

In an embodiment, the method 100 further comprises loading at least one sauce tube 11 from a storage tray 95 located in the sauce storage area 37 to the serving station 17 (Step 105). Optionally the arm 16 may transfer the sauce tubes 11 from the sauce storage area 37 to the serving station 17 and vice versa. Preferably the sauce tube 11 is placed on the sauce turntable 49 located in the serving station 17.

The method 100 may further comprise heating the sauce tube 11 prior to dispensing the sauce. For example, the sauce tube 11 may be heated in the serving station 17 by the sauce turntable 49. In such an embodiment, the sauce turntable 49 is heated. For example, the method 100 may comprise activating a heating plate located in the sauce turntable 49 to uniformly heat the sauce tube 11. In another example, the method may comprise using a heating coil located in the sauce turntable 49 to heat the sauce tube 11. In yet another example, the sauce tube 11 is placed in heated jackets located in the sauce turntable 49. This allows the frozen confectionary product 28 to be crated with both hot and cold elements.

In an embodiment, the method 100 further comprises removing a sealing cap 83 from the sauce tube 11 to allow a serving of the sauce to be dispensed. For example, the sealing cap 83 can be removed at the sealing cap removal station 59. Optionally the sealing cap 83 may be pushed into the sauce tube 11 to allow dispensing of a serving of the sauce contained in the sauce tube 11.

In an embodiment, the method 100 comprises dispensing a serving of one or more sauces from one or more sauce tubes 11 into the container 8 (Step 106). Dispensing the serving of the sauce may comprise, for example, dispensing hot fudge into the container 8.

Preferably dispensing the serving of sauce comprises using the laser curtain 41 to detect the amount of sauce dispensed to ensure the correct amount of sauce is dispensed as determined by the controller 27. If the laser curtain 41 determines the correct amount of sauce has been dispensed, the container 8 may automatically proceed through the dispensing process without user input. If the laser curtain 41 determines not enough sauce has been dispensed, more sauce can automatically be dispensed. If the laser curtain 41 determines too much sauce has been dispensed, the container 8 may proceed through the dispensing process or the container 8 may be sent to the waste bin 19.

In an embodiment, the method 100 further comprises loading at least one topping tube 10 from a storage tray 95 located in the topping storage area 36 to the serving station 17 (Step 107). Optionally the arm 16 may transfer the topping tubes 10 from the topping storage area 36 to the serving station 17 and vice versa.

Optionally the method 100 further comprises dispensing a serving of one or more toppings from one or more topping tubes 10 into the container 8 (Step 108). Dispensing a serving of the topping may comprise, for example, dispensing nuts into the container 8.

In an embodiment, the laser curtain 41 may to determine if the correct amount of topping as determined by the controller 27 has been dispensed into the container 8. If the laser curtain 41 determines the correct amount of topping has been dispensed, the container 8 may automatically proceed through the dispensing process. If the laser curtain 41 determines not enough topping has been dispensed, more toppings will be dispensed. If the laser curtain 41 determines too much topping has been dispensed, the container 8 may proceed through the dispensing process or the container 8 may be sent to the waste bin 19.

In an embodiment, the method 100 further comprises dispensing a spoon. For example, the method 100 may comprise placing a spoon into the container 8. In an embodiment, the spoon dispenser 18 may dispense the spoons. In an embodiment, the spoons are edible. In an embodiment, placing the spoon into the container 8 comprises using a gripper to pick up and place the spoon. In an embodiment, placing the spoon comprises placing the spoon into the container 8 prior to conveying the container 8 to the outlet 7. In an embodiment, placing the spoon comprises placing the spoon in the outlet 7 separately from the container 8.

In an embodiment, the frozen confectionary product 28 is provided to the outlet 7 (Step 108). In an embodiment, a consumer removes the frozen confectionary product from the outlet 7. Preferably the outlet 7 is visible to the consumer In an embodiment, the method 100 comprises transferring the frozen confectionary product 28 to a buffer unit 6 if the consumer has not removed the frozen confectionary product 28 from the outlet 7 in a pre-determined amount of time. Preferably the conveyor sling 55 may be configured to transfer the frozen confectionary product 28 to the buffer unit 6. In a preferred embodiment, the conveyor sling 55 automatically transfers the frozen confectionary product 28 to the buffer unit 6 without user input after a pre-determined amount of time has passed. For example, the serving unit 50 may comprise a timer configured to measure the amount of time a frozen confectionary product 28 has been placed on the serving unit 50. Preferably, in response to a signal from the serving unit 50, the conveyor sling 55 may transfer the frozen confectionary product 28 to the buffer unit 6.

In an embodiment, a consumer may pre-order a frozen confectionary product 28. In such an embodiment, the buffer unit 6 with an elevator stacker can be used to store the frozen confectionary product 28 for a pre-determined amount of time and provide the pre-ordered frozen confectionary product 28 to the outlet 7.

In an embodiment, the method 100 may comprise receiving the storage tray 95 comprising the frozen confectionary tubes 2, the topping tubes 10, and/or the sauce tubes 11 from a production facility. In such an embodiment, the service doors 9 may be configured to open and receive the storage tray 95. For example, the service doors 9 may comprise sliding skids configured to be pulled out to receive the storage tray 95. As a result, the frozen confectionary tubes 2, the topping tubes 10, and/or the sauce tubes 11 can advantageously be easily inserted and removed from the dispensing machine 1. In an embodiment, the service doors 9 may comprise alarms. Preferably the frozen confectionary tubes 2 are shipped in a refrigerated box from the production facility.

In an embodiment, the method 100 may comprise detecting if the amount of frozen confectionary, sauces, and/or toppings in the frozen confectionary tubes 2, the sauce tubes 11, and/or the topping tubes 10 is lower than a pre-determined threshold. For example, less than ten percent full. Preferably if the system detects the frozen confectionary tubes 2, the topping tubes 10, and/or the sauce tubes 11 are lower than a pre-determined threshold, the system will trigger an exchange for a replacement tube. In an embodiment, the detection system 43 may determine if the frozen confectionary tubes 2, the topping tubes 10, and/or the sauce tubes 11 are lower than a pre-determined threshold. If the frozen confectionary tubes 2, the topping tubes 10, and/or the sauce tubes 11 are lower than a pre-determined threshold, the dispensing machine 1 can automatically contact a production facility (e.g., through wireless communication) to order more frozen confectionary tubes 2, topping tubes 10, and/or sauce tubes 11 as will be discussed later in greater detail.

In an embodiment, the substantially emptied tubes are moved to an empty tube position 39 located in the dispensing machine 1. Preferably the emptied tubes are then removed and transported to a remote location (e.g., the production facility or an intermediate location) to be cleaned and reused.

Figure 15:
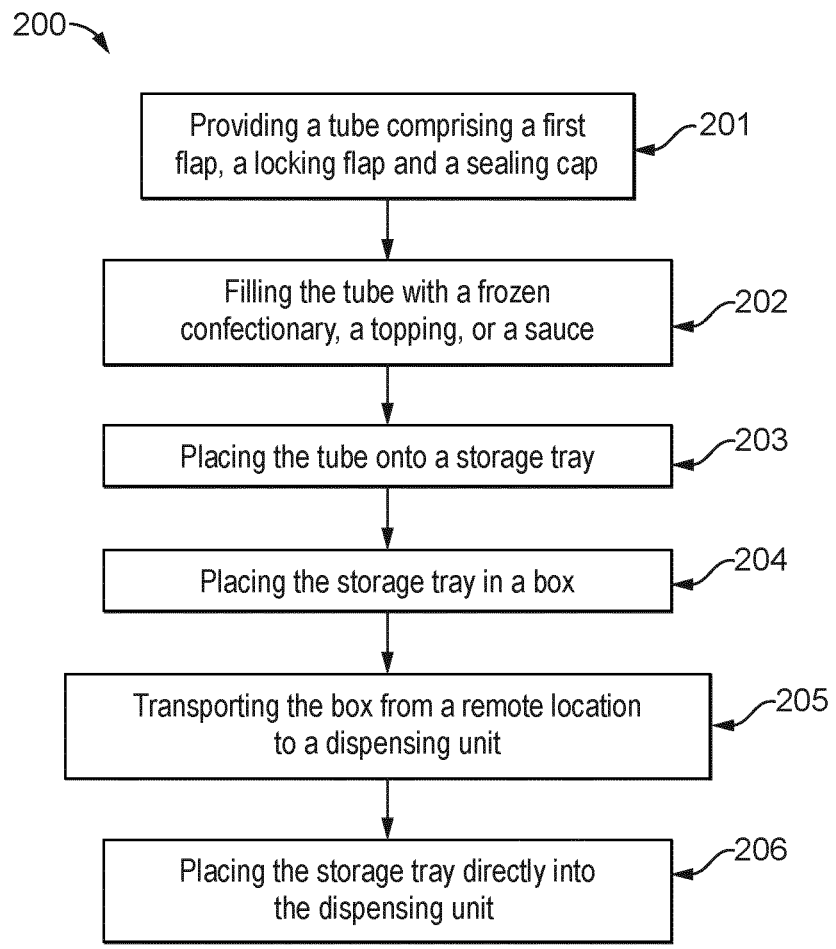
FIG. 15 is a flowchart showing a non-limiting example of a method according to the present disclosure.

Another aspect of the present disclosure is a method 200 of supplying frozen confectionary and/or frozen confectionary components to a dispensing machine. A non-limiting example of the method 200 is generally illustrated in FIG. 15. Some embodiments of the method 200 can omit one or more of the steps depicted in FIG. 15, and some embodiments of the method 200 can include one or more additional steps. The depicted steps are preferably performed in the order in which they are illustrated (as shown by arrows), but some embodiments can perform the steps in a different order. Indeed, the present disclosure is not limited to the specific embodiment shown in FIG. 15.

The method 200 preferably comprises providing a tube with a first flap, a locking flap and a sealing cap; filling at least a portion of the tube with a frozen confectionary, a sauce, or a topping; placing the tube onto a storage tray; transporting the storage tray containing the tubes to a dispensing machine 1; and placing the storage tray directly into the dispensing machine 1 without removing the tubes from the storage tray or removing the contents from the tubes. A detailed description of the method 200 now follows.

In an embodiment, the tube may be a frozen confectionary tube 2, a topping tube 10 and/or a sauce tube 11.

In an embodiment, the method 200 comprises providing a tube comprising a first flap 71 to avoid slipping during the movement of the tube (Step 101). In an embodiment, the method 200 may comprise providing a tube comprising one or more locking flaps 82 configured to lock the frozen confectionary tube 2 into the transport tray 95. In an embodiment, the method 200 comprises providing a tube with at least one sealing cap 83. In an embodiment, the method 200 comprises providing a tube with a sliding gate 91.

In an embodiment, the method 200 comprises filling the tube with a frozen confectionary, sauce, and/or topping (Step 202). The tube may be filled at a production facility.

In an embodiment, the method 200 comprises placing the tubes on a storage tray 95 (Step 203). Placing the tubes on the storage tray 95 may comprise using the one or more locking flaps 82 to lock the tubes onto the storage tray 95.

In an embodiment, the method 200 comprises placing the storage tray 95 in a box (Step 204). In an embodiment, the box may be a refrigerated box.

In an embodiment, the method 200 may comprise transporting the box from a remote location to the dispensing machine 1 (Step 205).

In an embodiment, the method 200 may comprise placing the storage tray 95 directly into the dispensing machine 1 without removing the tubes from the storage tray 95. In such an embodiment, the service doors 9 may be configured to open and receive the storage tray 95. For example, the service doors 9 may comprise sliding skids configured to be pulled out to receive the storage tray 95. As a result, the tubes can advantageously be easily inserted and removed from the dispensing machine 1.

In an embodiment, the method 200 further comprises cleaning the tubes prior to providing the tubes to be filled with a frozen confectionary, sauce, and/or topping. The cleaning may be performed at a different location than the dispensing machine 1. Preferably cleaning the tubes comprises cleaning the tubes with hot water and sanitizing the tubes. For example, water at a temperature of about 90° C. can be used.

As a non-limiting example, the cleaning can comprise ultra-sonic cleaning such as a pH 12 ultra-sonic bath (e.g., at a pH of about 12.0); and the tubes can comprise or consist of materials that can withstand such washing. However, the present disclosure is not limited to a specific embodiment of the cleaning, and the cleaning can be any means known in the art that reduces the residual material on the tubes.

A method for real-time ordering and inventory management of the dispensing machine 1 is also disclosed. The method comprises detecting if one or more tubes have an amount of content lower than a pre-determined threshold and automatically ordering replacement tubes from a remote location and/or automatically producing a frozen confectionary product or component thereof. In a preferred embodiment, the remote location is a production facility.

For example, the dispensing machine 1 may be in in direct communication with the production facility (e.g., a wireless communication connection). When the contents of the frozen confectionary tubes 2, the sauce tubes 11, and/or topping tubes 10 are lower than a pre-determined threshold, the dispensing machine 1 can alert the production facility that more tubes are needed and/or the tubes are automatically shipped from the production facility to the dispensing machine 1. Preferably the replacement tubes are shipped automatically after receiving an indication from the dispensing machine 1 with minimum or no user input.

In an embodiment, the method for real-time ordering and inventory management further comprises receiving an indication at a location remote from the dispensing machine (e.g., the production facility) that the empty tube position 39 is full. In such an embodiment, the dispensing machine 1 can alert the remote location that the empty tube position 39 is full and the remote location automatically arranges for removal of the empty tubes from the dispensing machine 1. In a preferred embodiment, the remote location is a production facility. The empty tubes may then be shipped to the remote location which can clean and optionally reuse the tubes.

As noted above, some embodiments of the methods 100 and 200 can omit one or more of the steps depicted in the figures, and some embodiments of the methods 100 and 200 can include one or more additional steps. The depicted steps are preferably performed in the order in which they are illustrated (as shown by arrows), but some embodiments can perform the steps in a different order. Indeed, the present disclosure is not limited to the specific embodiments shown in FIGS. 14 and 15.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A method of dispensing a frozen confectionary product from a dispensing machine, the method comprising:
   loading one or more first tubes comprising a composition that is a frozen confectionary from a first storage tray onto a serving station of the dispensing machine, wherein the first storage tray is located in a first storage area of the dispensing machine, and wherein the one or more first tubes are reusable;
   positioning a container in a first position in the serving station under the one or more first tubes;
   dispensing at least a portion of the frozen confectionary into the container; and
   conveying the container comprising the frozen confectionary to an outlet located on the dispensing machine;
   the method further comprising:
   receiving the first storage tray from a location remote from the dispensing machine;
   placing the first storage tray directly into the first storage area;
   detecting when contents of one of the one or more first tubes is below a pre-determined threshold; and
   moving the one of the one or more first tubes having contents below the pre-determined threshold into an empty tube position in the dispensing machine.

2. The method of claim 1, wherein the dispensing of at least a portion of the frozen confectionary into the container comprises:
   cutting the frozen confectionary using a cutting device provided by the dispensing machine.

3. The method of claim 1, comprising receiving an indication of a type of frozen confectionary product to be dispensed from a user interface.

4. The method of claim 1, wherein the frozen confectionary is in a shape selected from the group consisting of a disc, a star, a hexagon, a square and a polygon.

5. The method of claim 1, wherein the container is an edible container.

6. The method of claim 1, further comprising:
   loading one or more second tubes comprising an additional component from a second storage tray onto the serving station, wherein the second storage tray is located in a second storage area of the dispensing machine separate from the first storage area, wherein the one or more second tubes are reusable;
   positioning the container in the serving station under the one or more second tubes; and
   dispensing at least a portion of the additional component into the container.

7. The method of claim 2, wherein the additional component is at least one of a sauce or a topping.

8. The method of claim 6, further comprising heating the one or more second tubes in the serving station prior to dispensing the portion of the additional component into the container.

9. The method of claim 1, wherein positioning the container comprises using a robotic arm.

10. The method of claim 9, wherein the robotic arm is a three-axis robotic arm.

11. The method of claim 9, wherein the robotic arm comprises a lifting suction head to grip the container.

12. A method of dispensing a frozen confectionary product from a dispensing machine, the method comprising:
    loading one or more first tubes comprising a composition that is a frozen confectionary from a first storage tray onto a serving station of the dispensing machine, wherein the first storage tray is located in a first storage area of the dispensing machine, and wherein the one or more first tubes are reusable;
    positioning a container in a first position in the serving station under the one or more first tubes;
    dispensing at least a portion of the frozen confectionary into the container;
    conveying the container comprising the frozen confectionary to an outlet located on the dispensing machine; and
    conveying the frozen confectionary product from the outlet to a buffer unit on the dispensing machine.

13. A method of dispensing a frozen confectionary product from a dispensing machine, the method comprising:
    loading one or more first tubes comprising a composition that is a frozen confectionary from a first storage tray onto a serving station of the dispensing machine, wherein the first storage tray is located in a first storage area of the dispensing machine, and wherein the one or more first tubes are reusable, wherein loading the one or more first tubes comprises using a robotic arm;
    positioning a container in a first position in the serving station under the one or more first tubes;
    dispensing at least a portion of the frozen confectionary into the container; and
    conveying the container comprising the frozen confectionary to an outlet located on the dispensing machine.

14. A method of dispensing a frozen confectionary product from a dispensing machine, the method comprising:
    loading one or more first tubes comprising a composition that is a frozen confectionary from a first storage tray onto a serving station of the dispensing machine, wherein the first storage tray is located in a first storage area of the dispensing machine, and wherein the one or more first tubes are reusable;
    positioning a container in a first position in the serving station under the one or more first tubes;
    dispensing at least a portion of the frozen confectionary into the container;
    conveying the container comprising the frozen confectionary to an outlet located on the dispensing machine;
    wherein the dispensing machine comprises at least two zones, the at least two zones comprising a first zone wherein the temperature is lower than a second zone, wherein the one or more first tubes are stored in the dispensing machine in the first zone, and the serving station is located in the dispensing machine in the second zone.

* * * * *